United States Patent [19]

Sauerwein et al.

[11] 3,934,661
[45] Jan. 27, 1976

[54] DUST CUP

[75] Inventors: William D. Sauerwein, Joppa, Md.;
Daniel Harrison Sides, New Freedom, Pa.

[73] Assignee: The Black and Decker Manufacturing Company, Towson, Md.

[22] Filed: Aug. 14, 1974

[21] Appl. No.: 497,233

[52] U.S. Cl. .................................. 175/211; 175/84
[51] Int. Cl.² ........................................ E21C 7/00
[58] Field of Search ............ 175/207, 209, 210, 211, 175/213, 84; 279/1 Q, 103; 408/67, 72

[56] References Cited
UNITED STATES PATENTS

| | | | |
|---|---|---|---|
| 1,131,009 | 3/1915 | Rylander | 175/209 |
| 2,107,552 | 2/1938 | Smith | 175/209 |
| 2,643,088 | 6/1953 | Hornack | 175/209 X |
| 2,792,199 | 5/1957 | Becker et al. | 175/211 |
| 2,918,290 | 12/1959 | Werstein | 279/103 UX |
| 3,339,435 | 9/1967 | Heitz | 175/211 X |
| 3,340,915 | 9/1967 | Passer | 408/72 |
| 3,499,641 | 3/1970 | Peterson | 175/209 X |
| 3,583,821 | 6/1971 | Shaub et al. | 175/211 X |

FOREIGN PATENTS OR APPLICATIONS

| | | | |
|---|---|---|---|
| 653,033 | 9/1964 | Belgium | 175/211 |
| 773,892 | 5/1967 | United Kingdom | 175/209 |
| 457,322 | 7/1968 | Switzerland | 175/209 |

*Primary Examiner*—David H. Brown
*Attorney, Agent, or Firm*—William Kovensky; Joseph R. Slotnik; Edward D. Murphy

[57] ABSTRACT

A dust cap particularly for use with an overhead rotary hammer. The dust collector is a cup-like member with a bellows side wall, integrally formed in one piece. It has a thickened neck to fit on the tool shank below the chuck, thereby encompassing the chuck and the lower end of the anchor. Dust is efficiently caught in that the bulk of the dust passes through the anchor and chuck, and then directly into the dust collector cup, plus most of the dust outside the anchor is also caught as it falls around the anchor. The bellows side wall facilitates changing tools and removing anchor ends.

7 Claims, 4 Drawing Figures

U.S. Patent   Jan. 27, 1976   3,934,661
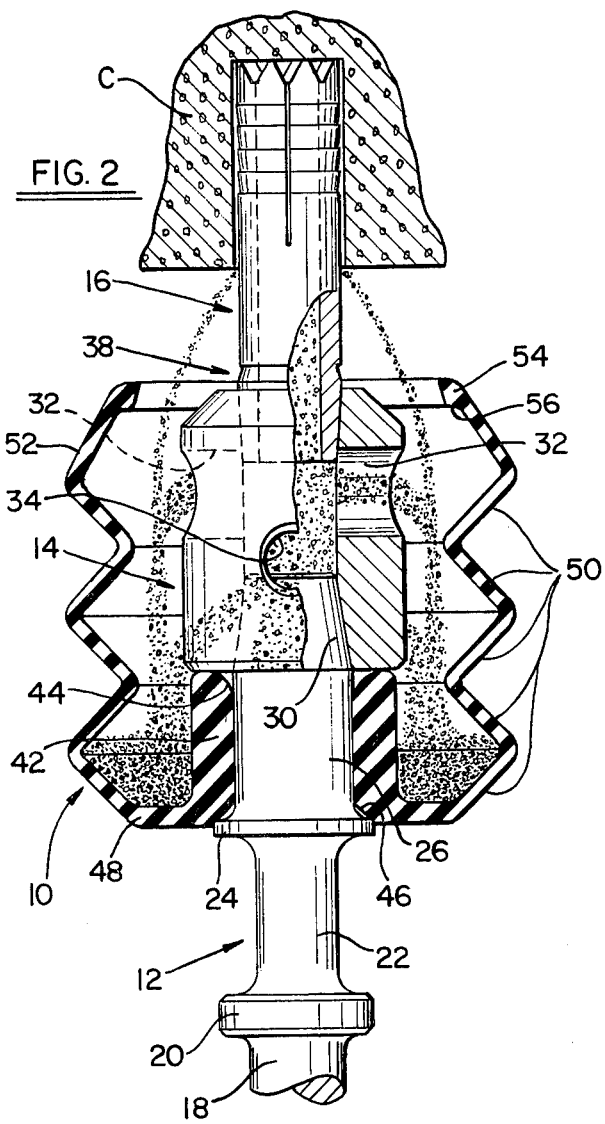
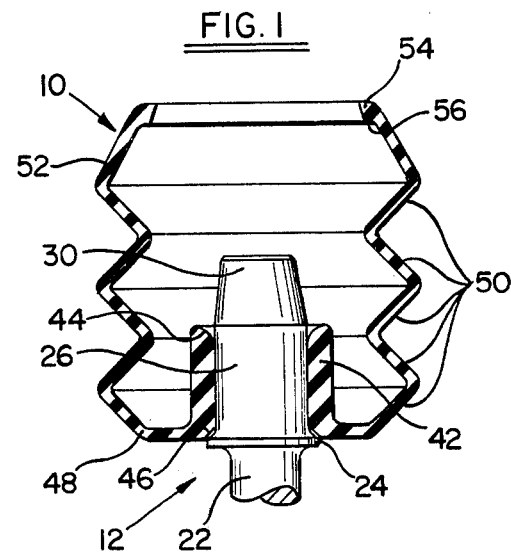
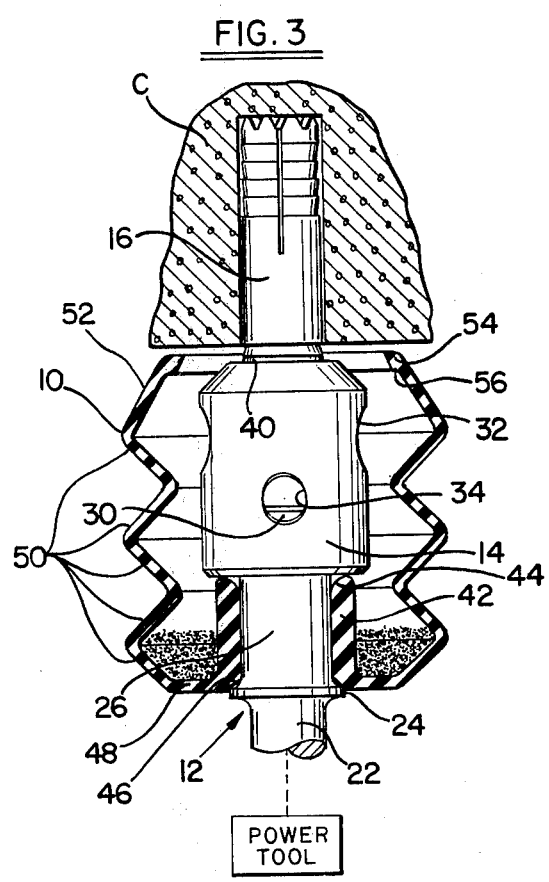
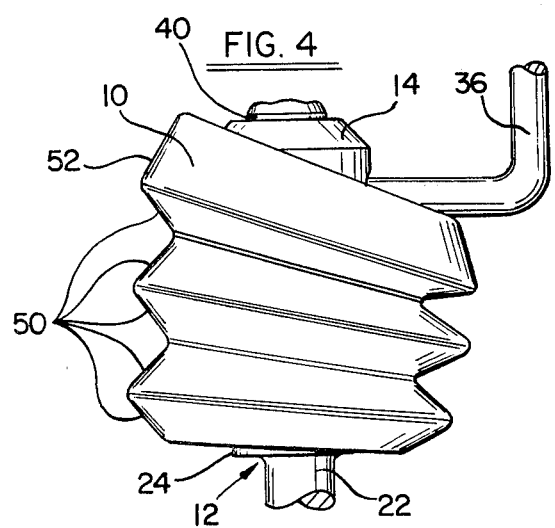

DUST CUP

This invention pertains to a dust collector or dust cup adapted for use in drilling or other material deforming operations wherein objectionable cuttings, dust, chips, debris and the like (hereinafter generally called "dust") are created. The invention is particularly adapted for use with tools useful with certain types of masonry anchors, and still more particularly when such anchors are used in an overhead mode, that is when drilling in ceilings. If the dust from this type of operation were not caught, then it would fall on the operator with the risk of falling in his eyes, and could also cause other problems.

Thus an advantage of dust cups generally, including the invention device, is that it protects the operator, while it also protects the tool from the incursion of fine dust which possibly could harm the tool. Dust collection tends to keep the work site and the surrounding air cleaner and safer.

The invention was developed for and is particularly adapted for use with a specific type of self drilling masonry anchor. This anchor, and associated tools, are known as self drilling anchors, and they and their associated tools are described in a large number of patents, typical of which are U.S. Pat. Nos. 1,968,055; 2,794,922; 2,801,614; and 2,936,736. When these anchors are driven into masonry, relatively large amounts of concrete dust and debris are produced. When operating in a ceiling or overhead, or even in walls on occasion, this dust is objectionable. The invention provides an improved dust collector for cooperation with the tools used to drive this type of anchor wherein virtually all of this dust is collected, thus solving the prior problems of dust accumulation and the like, as mentioned above. The invention utilizes the fact that the anchor and the special chuck used to drive the anchor are both hollow whereby the bulk of the dust produced travels through the anchor itself and through the chuck and is thereby readily collected by the invention dust collector. The anchors are typically driven by a portable electric rotary hammer.

Another advantage of the invention dust collector is that it inherently acts as a depth guide for the drilling of the anchor into the masonry ceiling or other "work." Since the bulk of the dust is passed through the anchor and chuck, the front end of the dust collector is made to terminate just at the parting line in the anchor, whereby by observing the contacting of the front end of the collector with the surface of the ceiling or other work the operator is automatically advised when the anchor is sufficiently deeply drilled into the work. This particular advantage is not available in prior art dust collectors which start in contact with the work and compress or otherwise deform as the anchor or tool bit is driven into the work.

Dust cups are not generally new, and many prior devices are available or known to those skilled in the art. However, all of these devices are either not adaptable for use with the usual type of anchor and chuck, or else suffer from other inherent disadvantages, or else suffer from both of these general disadvantages. One general type or class of such prior dust collectors are those which resemble force cups or plungers of the ordinary variety used in the home. These suffer from the disadvantages of blocking the operator's view of the location of entry of the tool bit or anchor into the work, and in some instances of requiring substantial force to compress them as they are driven towards the work surface. Another general type or feature found in prior dust cups are those which incorporate reinforcing members of various sorts, such as coils of spring wire or the like about which a compressible member is located. Such devices suffer from the disadvantages of additional cost of manufacture, greater susceptibility to wear because of the metal/flexible material interface, greater weight, and undesirable effect on visibility. Still another class of prior art devices or feature frequently found are those which comprise complicated means between the interface between the dust cup and the tool. Some such devices are fixed to the housing of the power tool, which suffers from the disadvantage of locating the dust cup further from the location of the bit or other working implement on the work, complicating the mounting of the dust collector on the tool, and, again, having a detrimental effect on operator visibility. Such prior devices often include clamps, bearings, screw devices, and the like which complicates the mounting and removal of the dust collector, and which discourages the use of the dust collection device because of the time required to manipulate it. Still another class of prior dust cups requires the operator to rotate or otherwise manipulate the cup in order to see the work site, and then move it again in order to continue drilling. Yet another feature found in prior art devices are those which mount on the drill bit or other working implements itself. Oftentimes such means will include bearings of various sorts to permit the dust collector to contact the work and remain stationary while the working implement rotates into the work. This has the obvious disadvantages of greatly increasing cost, weight, complication, susceptibility to wear, and the like. Yet another feature found in prior devices is a front wall or web of the dust cup which serves to guide the relative motion between the dust cup and the tool bit, to improve the contact between the dust cup and the work surface, and to add rigidity to the dust cup, particularly those made of resilient material. Such front walls suffer from the disadvantages of adding to cost, reducing the efficiency of dust collection and of reducing the flexibility aand usefulness of the dust cup by limiting the sizes of the bits or other working implements with which it may be used.

In summation of the present state of the dust collection art, the available devices are in fact very seldom used by operators of power tools, mostly because of the complications involved in mounting and dismounting. The operator would prefer the dust rather than the trouble of mounting and dismounting the prior art dust collectors.

It is highly desirable that, in order to cooperate with the anchor, the dust collector be flexible enough to allow insertion of a tool into the side of the chuck to remove the broken off driving end of the anchor from the chuck after the anchor itself is driven and broken off from its driving end, and flexible enough to allow insertion of a drift key for chuck head removal. Absent this flexibility, the cup would have to somehow be removed after each anchor driving operation, and to change chucks which would severely damage if not destroy its utility to the user. These capabilities are provided by the invention dust cup, while at the same time achieving all of its other advantages.

The present invention solves all of these problems, and at the same time provides an improved dust collector which is low in cost, easy and relatively inexpensive to manufacture, extremely simple to mount and dismount from its working implement, which is self supporting without the need for additional members, which has no harmful effect on the worker's visibility of the work in progress, which is virtually totally impervious to fatigue and breakage, which is of a very light weight, and yet which is highly efficient in dust collection use and general operation.

The above and other advantages of the invention will be pointed out or will become evident in the following detailed description and claims, and in the accompanying drawing also forming a part of the disclosure in which;

FIG. 1 is a cross-sectional elevational view of a dust collector embodying the invention mounted on a modified rotary hammer adaptor shank;

FIG. 2 is a view similar to FIG. 1 showing a self-drilling masonry anchor partially drilled into the work with the chuck partly in cross-section;

FIG. 3 is a view similar to FIGS. 1 and 2 showing the anchor fully driven; and

FIG. 4 is an elevational view showing the manner of removal of the broken off anchor driving end out of the adaptor chuck.

Referring now in detail to the drawings, the preferred embodiment of the invention dust cup 10 has been used with the common type of self driving anchor system referenced above. This system comprises a specially adapted driving shank 12, a chuck 14, and the anchor 16. While the preferred form of the invention dust collector and the tools with which it has been successfully used are shown in the drawing, the specific tools do not form an integral part of the present invention, it being understood that other embodiments of the dust collector are possible, and the invention may be used in other systems, all within the ambit of the following teaching, and the scope of the appended claims.

Since the invention is not limited to use with the particular chuck and anchor shown in the drawings, the term "working implement," "tool bit," and the like as used herein shall be understood to mean a drill, an anchor, masonry nails, or the like, which produce dust and which is adaptable to include a formed portion for cooperation with the invention dust cup 10.

The adaptor member 12 comprises a main shank portion 18 which is fitted into a rotary hammer or other power supply or tool (not shown) for driving anchor 16 into the ceiling C or other work. Beyond the main shank 18, adaptor 12 comprises a pair of shoulders 20 and 24 which define a reduced neck portion 22 therebetween. Neck 22 cooperates with a conventional retainer, not shown, which defines the limits of motion of the entire adaptor 12 with the parts 14 and 16 together with the invention dust cup 10 mounted thereon. Shoulder 24 is thinner than shoulder 20 for manufacturing reasons not important to the invention. Beyond collar 24, the adaptor 12 comprises invention cooperating means in the form of a cylindrical section 26 which serves as the connection means for the invention dust cup, as will be explained below. Finally, referring to FIG. 1, the outer end of the adaptor 12 comprises a tapered portion 30 which cooperates with the chuck 14, as is more fully explained in the above identified patents.

Chuck 14 is more fully described in the above identified patents. Briefly, it is a generally cylindrical member having an internal taper at each end, one for the adaptor 12, and the other at the forward end for cooperation with a similar taper in the anchor 16. Chuck 14 has a central opening interconnecting the two tapers, and is formed with two through bores at right angles to each other and at different locations along the chuck axis. These two bores 32 and 34, which extend completely across the chuck 14, each serve a dual function. The upper bore 32 serves as a location into which to insert a tool 36 (See FIG. 4) for removal of the broken off end of the anchor from the upper end of the chuck. The bore 34 serves a similar function for removal of the chuck itself. Additionally, and more importantly for purposes of the invention, and as is shown schematically in FIG. 2, both of these bores serve as conduits for dust produced by the drilling operation. It is significant that the bulk of the dust passes through the central hole in the anchor, then into the central opening in the chuck, and then through the various openings 33 and 34 and directly into the bottom of the dust collector 10.

Anchor 16 is well known in the art and is fully described in the above references. For purposes of the present invention, the significant point is the weakened portion 38. The manner of operation is to first place the invention dust cup then the chuck on the adaptor 12, and then the anchor in the chuck. The anchor is placed against the concrete and the tool is run, in the hammer only mode, until the anchor teeth have penetrated the surface of ceiling C. This will keep the anchor from "walking" when the drilling operation starts. Once started, drilling continues, with occasional stops to empty the dust cup and anchor of dust as needed, until the anchor is fully seated as shown in FIG. 3. After a final clearing of the dust out of the anchor, an expander plug (not shown) is put into the end of the anchor, the hammer only mode is used again, and the anchor is set into the hole by driving the plug into the anchor. The tool is then pulled sharply towards the operator to snap off the cone end of the anchor. This disposable driving end of the anchor can then be removed using the ejector key or tool 36, as shown in FIG. 4.

The invention dust cup is a one piece resilient member of generally bellows-like configuration, having several advantagous features built therein. More specifically, cup 10 comprises a thickened neck portion 42 which is inturned inside the cup, and which serves to hold the cup on the adaptor 12. At its inside end, the neck 42 is provided with a relatively large radius relieved curve 44. At its inside end, a chamfer 46 is provided. The relieved portions 44 and 46 facilitate removal and mounting of the cup on the cooperating portion 26, respectively. At its bottom end adjacent the chamfer 46, cup 10 comprises a bottom wall or web 48 disposed in a plane generally perpendicular to the axis of the adaptor 12, and of annular configuration. The body or side of the cup 10 is made up of a series of five walls 50, the rearmost one of which is connected to the outside edge of the bottom web 48. The walls 50 define the bellows-like configuration of the cup 10. They are disposed alternately radially outwardly and radially inwardly at an angle of approximately 45° from the axis of the adaptor 12. More or fewer walls 50 could be provided to adjust the overall length of the cup 10 as required by a specific chuck 14 or other environment in which the invention might be used. Beyond the outermost of the walls 50, cup 10 comprises a longer more steeply inclined wall 52 which defines the end of the bellows side of the cup. Wall 52 is inclined at a steeper angle to the axis, 30° for example, and is slightly longer than the walls 50, for improved visibility. Finally, at the forward end of the wall 52, cup 10 comprises an inturned short bead 54.

In regard to visibility, an important moment in time is when the anchor begins to enter the ceiling C. It is at this time, with the operator holding the hammer overhead and looking for the correct entry that the greater angle of the steep wall 52 comes into play. This wall 52 balances the need to have as wide an opening as possible in order to collect the maximum amount of dust while at the same time having a relatively steep angle so as to assure good visibility to the operator at the moment of entry. The inturned bead 54 stops dust which might adhere to the inside of the cup from migrating out of the cup due to the vibration and motion to which the cup is subjected in use. Bead 54 has no detrimental effect on dust collection because of its relatively short length, but has a material effect on preventing dust migrating out of the cup because of its inwardly facing flat annular surface 56, as shown in FIG. 2.

A significant advantage of the present invention is its great cost savings over prior cups which are fabricated in various ways, as by the inclusions of internal springs, collars, bearings, and the like. The invention cup is a simple one piece molded member formed entirely of a resilient material. Neoprene is presently preferred, although plastics, and possibly transparent plastics, could be used in place of neoprene or other rubber or rubber-like material. Fabricated dust cups are susceptible to being mishandled, stepped on, or broken, whereas the invention one piece molded rubber part is substantially impervious to such damage.

FIG. 4 shows another advantage of the invention. The anchor end removal tool 36 can be inserted by merely pushing the cup aside slightly to insert the tool in the upper through opening 32, as shown. In this manner, the collected dust at the bottom of the cup is not disturbed, whereby the possibility of accidentally spilling collected dust is substantially eliminated.

Another advantage of the invention cup 10 is that its length is made to coincide with the length from the upper collar 24 to the end of the chuck 14, as shown in FIG. 2. In this manner, the operator is given an automatic indication of when the anchor is properly driven by movement or deflection of the cup when it first touches the ceiling of work C. Thus, just at about the time when visibility is totally cut off, the operator will be informed that the anchor is drilled to its proper depth, and driving and rotation should cease. Of course, for a different size and length chuck 14, an appropriately shortened or lengthened cup 10 may be provided.

It is significant that the invention dust cup can be used with many different tools and working implements, the only requirement being that the implement be formed with a cooperating portion such as cylindrical portion 26 to mate with an appropriately formed neck 42 in the invention cup. It is a simple matter to provide such cooperating means.

The thickened neck 42 and the cooperating shank portion 26 are both cylindrical in the preferred embodiment in the drawing. However, this interface between the invention cup 10 and the cooperating portion of the tool bit 26 could take many different forms, for example, in cross-section, splines could be provided, or a hexagonal, oval, pentagonal or other non-round cross-sectional shape could be provided. The variation could be along the axis, for example, a tapered interface could be provided or a hyperbolic surface, or other shapes. In summary then, what is necessary is merely some cooperating means between cup and shank to hold the cup in place while permitting easy mounting and dismounting. Thus, the term "cooperating portion," "cooperating means" and the like as used in the specification and claims herein shall be understood to include all such ways and devices for holding the cup in place.

The invention cup is mounted and dismounted from the cylindrical section 26 by simply working the neck 42 onto the tool bit with a simultaneous rotation and pushing or pulling motion. Removal can be even simpler, the operator simply gets a firm grasp of the sides of the cup and pulls the cup directly off of the cylindrical section 26. The resiliency of the material and its strength prevent damage to the cup by this technique. Removal and insertion respectively are facilitated by the two relieved portions 44 and 46.

Another advantage of the relatively thickened portion of the neck 42 is that by providing a greater amount of resilient material, the part is protected against material fatigue with repeated use, and against rolling over or "peeling" during mounting and dismounting. The amount of interference between neck 42 and cylindrical section 26 is not critical, simply loose enough to permit assembly and disassembly, but tight enough to prevent a sloppy fit.

While the invention has been described in detail above, it is to be understood that this detailed description is by way of example only, and the protection granted is to be limited only within the spirit of the invention and the scope of the following claims.

We claim:

1. In combination with a self-drilling anchor, a chuck for holding said anchor, an adaptor shank for holding said chuck, and a power tool to drive said shank and chuck and anchor; the improvement comprising a cooperating portion on the adaptor shank located below said chuck and opposite said anchor mounted in said chuck, a dust cup operatively cooperable with said formed portion to hold said dust cup on said formed portion, said dust cup consisting of resilient material and comprising a neck portion adapted to be engaged with said cooperating portion of said shank, an annular wall at the rear end of said neck portion and extending radially outwardly therefrom, a plurality of sidewall portions extending forwardly from the outside of said annular wall and overlying said neck portion and said chuck, and each of said sidewall portions being alternately radially inwardly forwardly and radially outwardly forwardly disposed, whereby the side of said dust cup is of a bellows-like configuration.

2. The combination of claim 1, wherein said power tool is an electric rotary hammer.

3. The combination of claim 1, wherein the rear and forward ends of the inside of said neck portion are relieved to facilitate the mounting and dismounting of said cup on said cooperating portion of said shank.

4. The combination of claim 1, wherein said forward sidewall portion is inclined radially inwardly forwardly at a predetermined angle to the axis of said shank which is smaller than the angle of any of the others of said sidewall portions to said axis.

5. The combination of claim 1, and a radially inwardly extending short bead portion having a rearward facing annular wall at the forward end of the forward-most sidewall portion, whereby dust migration out of said cup is reduced.

6. The combination of claim 1, wherein said cooperating portion of said shank is of a predetermined shape; and said neck is thickened compared to either one of said annular wall and sidewall portions, and is of a mating predetermined shape.

7. The combination of claim 6, wherein said cooperating portion of said shank is cylindrical.

* * * * *